United States Patent
Miyakawa et al.

[11] Patent Number: 5,441,685
[45] Date of Patent: Aug. 15, 1995

[54] METHOD FOR PRODUCING A WINDOW GLASS EDGING MEMBER FOR A VEHICLE SUCH AS AN AUTOMOBILE

[75] Inventors: Naohisa Miyakawa, Shiroi; Minoru Masuzawa, Kashiwa; Katsuhisa Kato, Moriya, all of Japan

[73] Assignees: Tokiwa Chemical Industries Co., Ltd.; Masuzawa Chemical Sales Co., Ltd., both of Chiba; System Technical Co., Ltd., Ibaragi, all of Japan

[21] Appl. No.: 183,796

[22] Filed: Jan. 21, 1994

Related U.S. Application Data

[63] Continuation-in-part of Ser. No. 827,114, Jan. 28, 1992, abandoned.

[30] Foreign Application Priority Data

Jan. 28, 1991 [JP] Japan .................. 3-091797
Mar. 29, 1991 [JP] Japan .................. 3-042009

[51] Int. Cl.6 .............................. B29C 47/06
[52] U.S. Cl. .................. 264/148; 156/244.18; 156/244.24; 156/244.25; 264/171; 264/177.19; 264/300; 425/133.5
[58] Field of Search ............ 264/171, 177.10, 177.16, 264/130, 131, 122, 300, 148–149; 425/133.5; 49/475, 491, 440, 441, 491.1, 495.1; 156/244.24, 244.25, 244.18

[56] References Cited

U.S. PATENT DOCUMENTS

| | | |
|---|---|---|
| 3,685,206 | 8/1972 | Kessler . |
| 3,872,548 | 3/1975 | Bryant et al. ............... 24/73 HS |
| 3,897,967 | 8/1975 | Barenyi . |
| 3,918,206 | 11/1975 | Dochnahl ...................... 49/441 |
| 3,927,493 | 12/1975 | Tsuneishi et al. . |
| 4,275,099 | 6/1981 | Dani . |
| 4,351,868 | 9/1982 | Otani . |
| 4,360,549 | 11/1982 | Ozawa et al. . |
| 4,442,156 | 4/1984 | Yamaguchi ................... 49/475 |
| 4,643,923 | 2/1987 | Bernitz et al. . |
| 4,662,113 | 5/1987 | Weaver ....................... 264/300 |
| 4,668,543 | 5/1987 | Schlenz . |
| 4,897,298 | 1/1990 | Otawa et al. ................. 49/441 |
| 4,915,856 | 4/1990 | Jamison ...................... 252/26 |
| 4,923,759 | 5/1990 | Brooks et al. . |
| 4,929,490 | 5/1990 | Iwasa . |
| 4,962,136 | 10/1990 | Peters ....................... 523/220 |
| 4,969,293 | 11/1990 | Guillon . |
| 4,996,011 | 2/1991 | Sano et al. .................. 264/300 |
| 5,005,317 | 4/1991 | Saint-Louis Augustin et al. . |
| 5,013,379 | 5/1991 | Brooks et al. ................ 49/441 |
| 5,014,464 | 5/1991 | Dupuy et al. ................. 49/491 |
| 5,042,201 | 8/1991 | Vaughn . |
| 5,044,684 | 9/1991 | Yada . |
| 5,125,185 | 6/1992 | Shiota et al. . |
| 5,136,773 | 8/1992 | Mesnel ....................... 264/171 |
| 5,137,675 | 8/1992 | Rabe ........................ 264/177.16 |
| 5,183,613 | 2/1993 | Edwards .................... 264/177.1 |
| 5,265,377 | 11/1993 | Iwasa et al. ................ 156/244.25 |
| 5,267,846 | 12/1993 | Miyama et al. ............. 264/177.16 |

FOREIGN PATENT DOCUMENTS

| | | |
|---|---|---|
| 54-107963 | 8/1979 | Japan ....................... 264/130 |
| 59-201838 | 11/1984 | Japan ...................... 264/177.1 |
| 61-2085 | 1/1986 | Japan . |
| 62-255217 | 11/1987 | Japan ....................... 49/475 |
| 1-35740 | 7/1989 | Japan . |
| 1-249513 | 10/1989 | Japan ....................... 49/475 |
| 2220969 | 1/1990 | United Kingdom ............ 49/475 |

*Primary Examiner*—Jeffery R. Thurlow
*Attorney, Agent, or Firm*—Wenderoth, Lind & Ponack

[57] ABSTRACT

An edging member of a window glass for an automobile door is provided with a plurality of contacting portions to which the window glass is contacted. Each of the contacting portions is provided with a batten surface layer including a synthetic resin such as nylon, urethane and polyolefin resin, and powders or grains of mica, molybdenum and/or graphite mixed with the synthetic resin. A rough surface having projections and recesses is formed on the front surface of the batten surface layer by extruding the batten surface simultaneously with the extrusion molding of the edging member.

11 Claims, 5 Drawing Sheets

METHOD FOR PRODUCING A WINDOW GLASS EDGING MEMBER FOR A VEHICLE SUCH AS AN AUTOMOBILE

This application is a Continuation-In-Part of now abandoned application, Ser. No. 07/827,114, filed on Jan. 28, 1992.

BACKGROUND OF THE INVENTION

The present invention relates to a window glass edging member provided for a door of a vehicle such as an automobile or the like, such that the window glass can be raised and lowered to close and open it, respectively, as easily (i.e. low load), smoothly and stably as possible, and so as to provide proper draining. This invention also relates to a method for producing the window glass edging member.

A window glass of this kind for a vehicle door is usually raised and lowered repeatedly to provide ventilation. Consequently, it is desirable that raising and lowering of the window glass be an easy operation, and it is necessary that a tight fit be provided for the window glass. Thus, there has recently been proposed and generally employed two types of edging members, including a guide edging member and a press edging member, for the window glass. These members are generally molded of a flexible component such as a flexible synthetic resin to provide for easy opening and closing of the window glass. The conventionally known edging members have fibers of nylon and the like flocked or implanted at the portion where the edging member touches the upper edge of the window glass, or has a fluoro-synthetic resin tape containing molybdenum fixed by an adhesive at a location where the edging member presses against the window glass.

This known edging member flocked or implanted with the nylon fiber satisfactorily engages with and disengages from the window to provide for a smoother opening and closing operation thereof, but a very complex process is required for flocking or implanting the fibers, and the process for applying an adhesive to the flocked or implanted portion is very troublesome. Moreover, repeated opening and closing of the window glass and penetration of rainwater cause the flocked or implanted fibers to bend down and/or wear to such an extent that the expected effectiveness is not achieved.

In the known edging member having the synthetic resin tape, there are many troublesome procedures required in adhesively fixing the synthetic resin tape onto the edging member as well as into a very complex inside portion of the edging member into which the upper edge of the window glass is inserted. Furthermore, the synthetic resin tape usually cannot be bonded on complex curved or cornered surfaces, i.e. other than on a planar surface of the edging member.

The edging member comprising a flexible component, such as a flexible synthetic resin, synthetic rubber, or the like, is also known. While the edging member is remarkably effective in waterproofing the window because the edging member is closely pressed against the window glass, this makes the opening and closing of the window glass difficult (i.e. high load) because of the strong pressing force and may eventually cause the window handle portion to break. These are the major defects in the prior art.

SUMMARY OF THE INVENTION

The object of the present invention is, therefore, to provide an edging member which allows the window glass to be raised and lowered easily and with low load, and which allows smooth and satisfactory engagement and disengagement of the window glass with and from the edging member over a long period of time, and to provide a method of easily producing such edging member.

According to the present invention, a method for producing an edging member for use in a door panel of a vehicle such as an automobile and which receives a window glass, comprises the steps of: forming the edging member by extruding a flexible synthetic resin; providing, on portions of the edging member which contact the window glass, a batten surface layer (or contacting layer) comprising a synthetic resin such as nylon, urethane and polyolefin resin and powders or grains of mica, molybdenum and/or graphite mixed with the synthetic resin; and extruding the batten surface layer simultaneously with the extrusion molding of the edging member; whereby a rough surface having projections and recesses is formed on the front surface of the batten surface layer.

Accordingly to the present invention, an edging member provided in a door panel which receives a window glass of a vehicle such as an automobile, comprises a guide edging member formed by longitudinally extruding a flexible synthetic resin. The guide edging member is provided with a groove portion into which an edge of the window glass is inserted, two supporting tongues facing each other from opposing sides of the opening of the groove portion, and a batten surface layer disposed on surfaces of the supporting tongues and on the inside of the groove portion which are adapted to be pressed into contact with the window glass when the window glass is closed. The batten surface layers each comprise a synthetic resin such as nylon, urethane and polyolefin resin, and powders and grains of materials mica, molybdenum and/or graphite mixed with the synthetic resin, so as to form rough surfaces with projections and recesses formed on the front surface of the batten surface layers by extruding the batten surface layers simultaneously with the edging member.

In the present invention, a press edging member is formed by longitudinally extruding a flexible synthetic resin and is provided with two supporting strip bodies opposed to each other and facing toward the window glass disposed therebetween, upper and lower pressing pieces provided respectively on the upper and lower portions of each of the two supporting strip bodies, a batten surface layer provided on upper and lower pressing pieces and against which the window glass is contacted. The batten surface layer comprises a synthetic resin such as nylon, urethane, and polyolefin resin, and powders and grains of mica, molybdenum and/or graphite mixed with the synthetic resin, to form a rough surface with projections and recesses formed on the front surface of the batten surface layer by extruding the batten surface layer simultaneously with the extrusion molding of the press edging member.

DETAILED DESCRIPTION OF THE PREFERRED EMBODIMENTS

Figure 1:
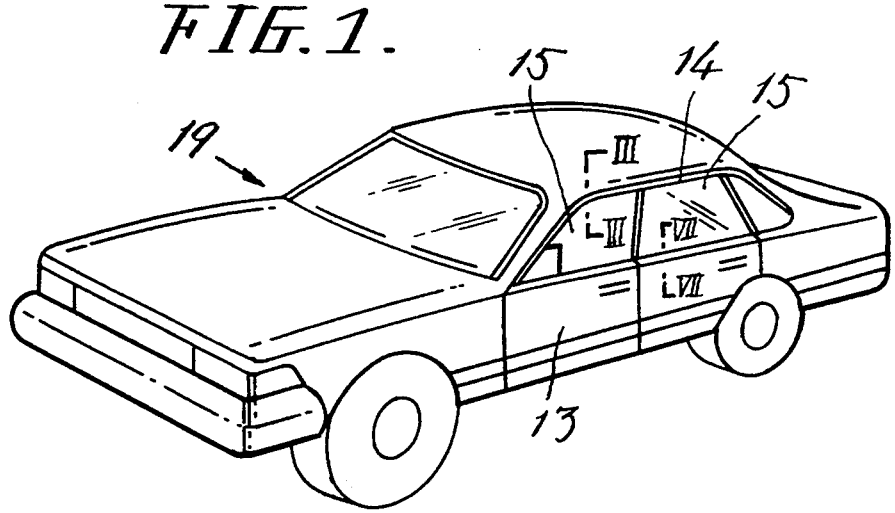
FIG. 1 is a perspective view of an automobile having edging members according to the present invention.
Figure 2:
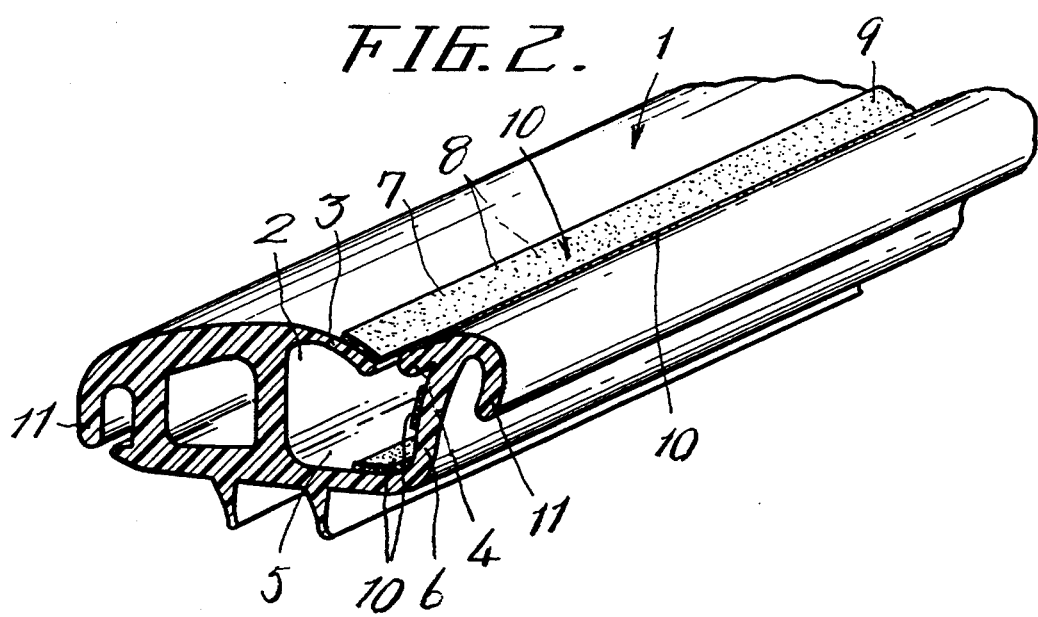
FIG. 2 is a perspective view of a guide edging member.
Figure 3:
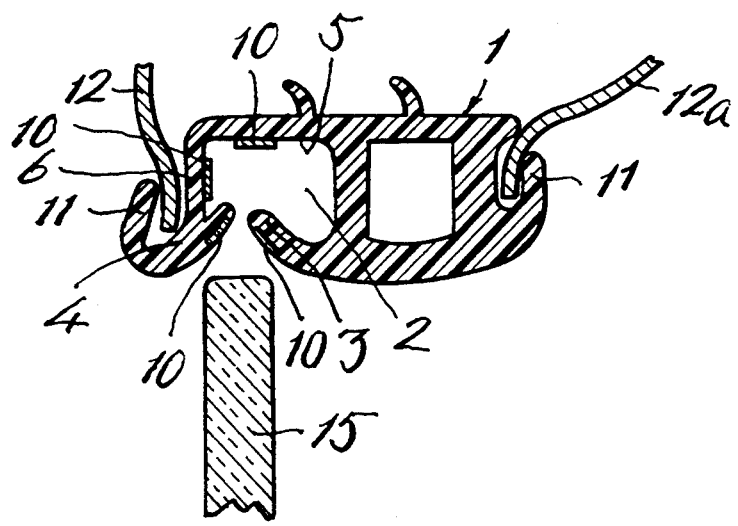
FIG. 3 is an enlarged sectional view of the guide edging member taken along line III—III of FIG. 1 showing the window glass in an open condition.
Figure 4:
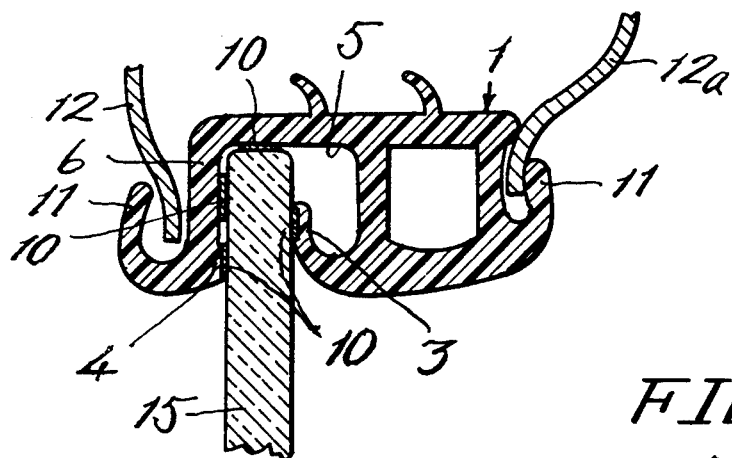
FIG. 4 is an enlarged sectional view of the guide edging member taken along line III—III of FIG. 1 showing the window glass in a closed condition.
Figure 5:
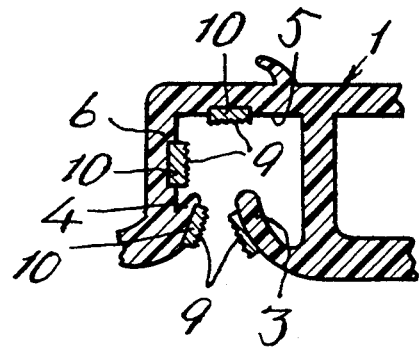
FIG. 5 is a partially cut-away sectional view of the guide edging member.

The present invention will now be described in detail referring to the accompanying drawings and, more particularly, to FIGS. 1 to 5 illustrating an embodiment of a guide edging member of the window glass edging member of a vehicle such as an automobile.

A guide edging member 1 is formed by molding a resilient and flexible synthetic resin, synthetic rubber or the like in the form of a longitudinal belt. The flexible synthetic resin can be chosen from among, for example, thermoplastic elastomers and polyolefin resins. The guide edging member 1 is to engage with a receiving frame 14 of a door panel 12 and permit an upper edge of the window glasses 15, 15 of the doors 13, 13 provided on a vehicle 19 to be raised and lowered to open and close the window with much less sliding resistance than in the prior art. The guide edging member 1 has a generally square cross-section and is provided with a groove portion 2 into which the upper edge of the window glass 15 is inserted. Supporting tongues 3, 4 are respectively formed on opposing sides of the inlet of the groove portion 2. The supporting tongues 3, 4 are respectively provided with batten surface layers (or contacting layers) 10 on the portions thereof against which the window glass 15 will be pressed when closed. The batten surface layers 10 comprise synthetic resin 7 such as nylon, urethane and polyolefin resin, with which powders or grains 8, 8 of mica, molybdenum and/or graphite are mixed. The batten surface layers 10 are formed by extrusion along with extrusion of the guide edging member, whereby rough surfaces 9 are formed on the front surfaces of the batten surface layers 10 to permit the window glasses 15, 15 to be opened and closed with much less sliding resistance.

Further, an inner bottom face 5 of the groove portion 2, against which the upper edge of the window glass 15 is pressed and a side wall 6 of the groove portion 2 against which the side surface of the window glass is pressed are also provided respectively with batten surface layers 10. These batten surface layers 10 also comprise a synthetic resin 7 of relatively low frictional resistance, such as nylon, urethane and polyolefin resin, with which powders and grains of mica, molybdenum and/or graphite are mixed. The batten surface layers 10 are formed by extrusion along with the guide edging member 1, whereby rough surfaces 9, 9 caused by the presence of the powders and grains 8 of mica, molybdenum and/or graphite are formed on the front surfaces of said batten surface layers 10. This permits the window glass 15 to be raised and lowered with much less sliding resistance. In addition, the guide edging member 1 is provided at its longitudinal sides with curved fastening pieces 11 which engage about the edges of the door panel 12, 12a.

Figure 6:
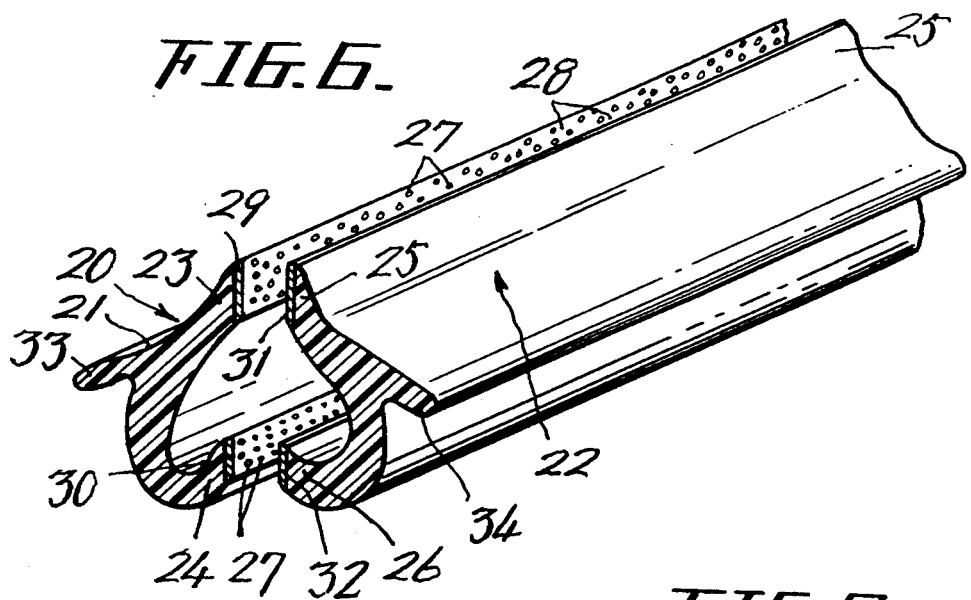
FIG. 6 is a perspective view of a press edging member.
Figure 7:
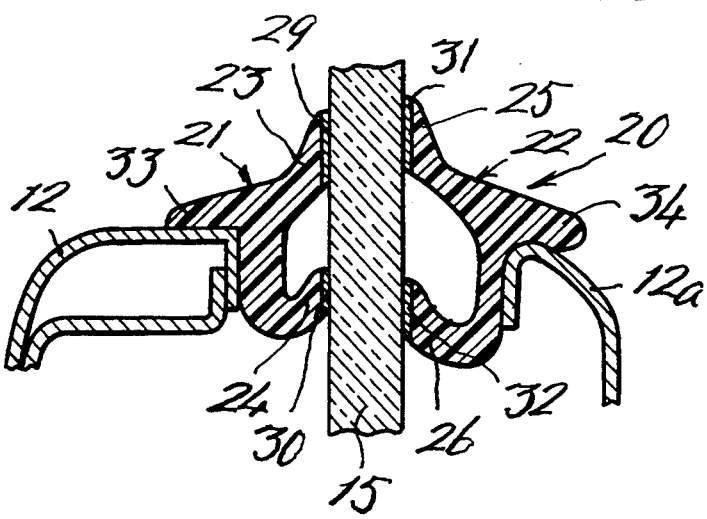
FIG. 7 is an enlarged sectional view of the press edging member taken along line VII—VII of FIG. 1.
Figure 8:
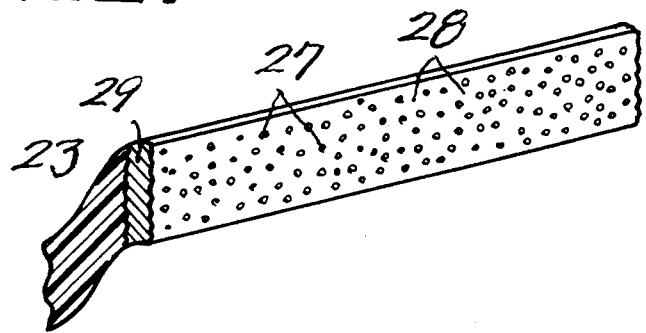
FIG. 8 is a perspective view of a strip body of the press edging member for pressing against a window glass.
Figure 9:
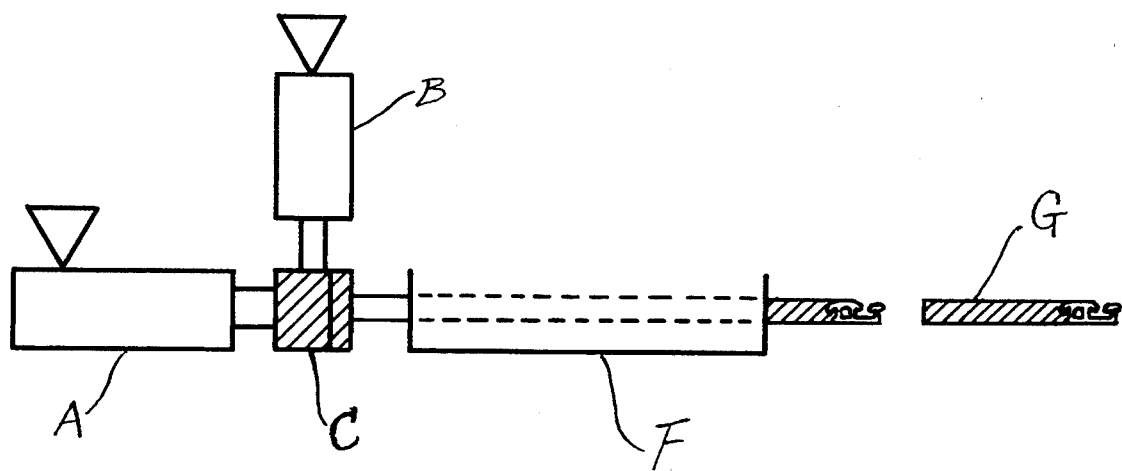
FIG. 9 schematically shows an extruding system used in forming the edging member of the present invention.
Figure 10:
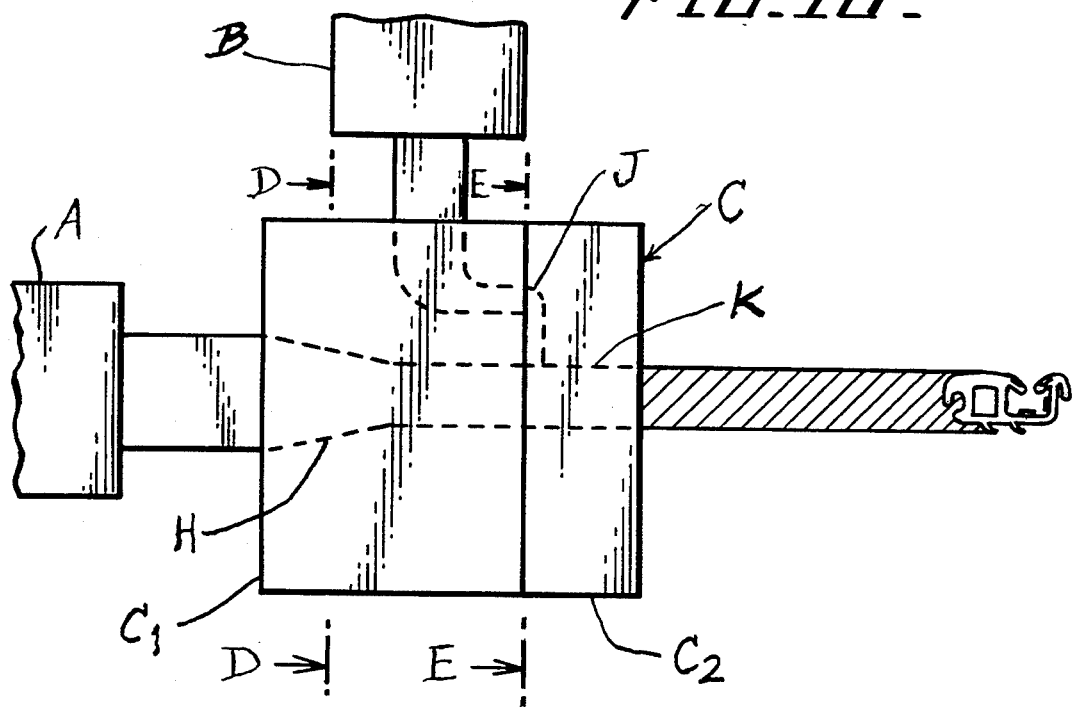
FIG. 10 is an enlarged view of a die of FIG. 9.
Figure 11:
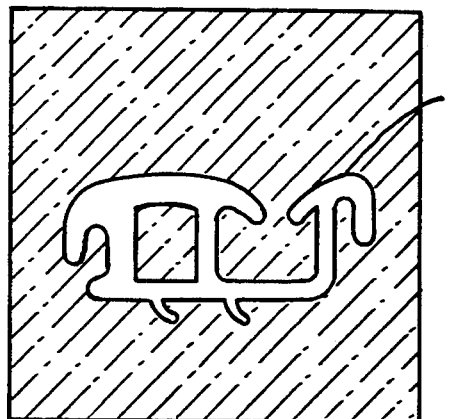
FIG. 11 is a cross-sectional view taken along line X—X in FIG. 10.
Figure 12:
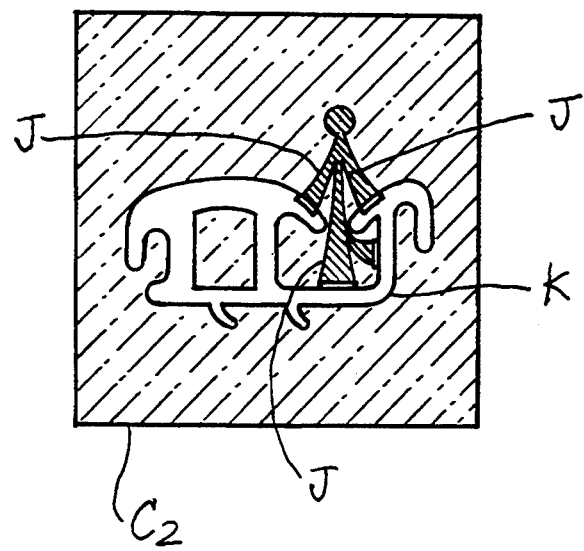
FIG. 12 is a cross-sectional view taken along line Y—Y in FIG. 10.

Referring to FIGS. 6 to 8, reference numeral 20 denotes a press edging member for pressing against both sides of the window glass 15 in order to drain rain-water during opening and closing of the windows of the doors 13, 13 of the vehicle 19. The press edging member 20 is formed by extruding longitudinally a flexible synthetic resin in a manner similar to the guide edging member 1 and comprises supporting strip bodies 21 and 22 on opposing sides of the window glass 15. The supporting strip body 21 is provided with an upper pressing piece 23 and a lower pressing piece 24 located at the upper and lower portions thereof, respectively. The supporting strip body 22 is likewise provided with an upper pressing piece 25 and a lower pressing piece 26 located at the upper and lower portions thereof, respectively.

Each contacting surface of the upper pressing pieces 23, 25 and the lower pressing pieces 24, 26 which is adapted to press against the window glass 15 is provided with a batten surface layer 29, 31 and 30, 32 respectively. Each batten surface layer 29, 31 and 30, 32 comprises a synthetic resin 28 of relatively low frictional resistance, such as nylon, urethane, and polyolefin resin, and powders and grains 27 of mica, molybdenum and/or graphite which do not melt at even high temperatures and which are mixed with the synthetic resin 28. The batten surface layers 29, 31 and 30, 32 are formed by extrusion simultaneously with the extrusion of the supporting strip bodies 21, 22, respectively. In this connection, a rough surface is formed on the front surface of each of the batten surface layers 29, 30, 31, 32 due to the powder and grains 27 of mica, molybdenum and/or graphite which does not melt at even high temperatures.

Further, the supporting strip bodies 21, 22 are provided at approximately longitudinal center portions thereof with collar portions 33, 34, respectively, to be fitted to both sides of the door panel 12, 12a, respectively.

The supporting strip bodies 21, 22 of the press edging member 20 are secured by means of an adhesive or the like to the door panel 12, 12a, respectively, located in the opening of the door 13 of the vehicle 19 through which the window glass 15 moves in and out. When the window glass 15 is raised or lowered to close and open the window, respectively, the coefficient of friction between the press edging member and the window glass is reduced due to the rough surface having the projections formed by the powder and grains 27 of mica, molybdenum and/or graphite and having the recesses formed by the synthetic resin 28 on each batten surface layer 29, 30 and 31, 32. Therefore the press edging member can be used repeatedly for a long period of time, due to the ease with which it is raised and lowered and the suitable contact between the window glass and the rough surface.

Working Example

Referring to FIGS. 9–12, a flexible synthetic resin which is made of a thermoplastic elastomer (Shore A hardness 80) for forming an edging member body is inserted into an extruding machine (A) and is heated to the temperature of about 190° C., while a mixture for forming batten surface layers is inserted into an extruding machine (B) and is heated to a temperature of about 220° C. The mixture for forming batten surface layers is composed of high polymer polyethylene resin, and powders or grains of molybdenum having a size of approximately 0.05mm. The two extruding machines (A) and (B) are connected respectively to one die (C) which is heated to a temperature of about 190° C., and the flexible synthetic resin for forming the edging member body and the mixture for forming the batten surface layer are extruded into the die (C). The temperature to which the die (C) is heated is chosen so that the flexible synthetic resin for forming the edging member body and the high polymer polyethylene resin are softened or melted sufficiently for extrusion, while the molybdenum powders or grains are not melted.

The die ($C_2$) comprises a die section ($C_1$) and die section ($C_2$). The die section ($C_1$) is provided with a guide slot (H) in the desired shape of the edging member body and with a flowing slot (I) for the mixture of the batten surface layer. The die section ($C_2$) is provided with an extruding slot (K) in the desired shape of the edging member body having the batten surface layer thereon, to which the guide slot (H) for the edging member body is connected and to which the flowing slot (I) for the batten surface layer is connected through guide slots (J) formed in the die section ($C_2$).

The flexible synthetic resin for the edging member body is extruded from the extruding machine (A) into the die (C) through the guide slot (H), and the mixture for the batten surface layer is extruded from the extruding machine (B) into the die (C) through the guide slots (J). In the extruding slot (K) of the die (C), the edging member body and the batten surface layer are extruded and polymerized (or colored) together, and consequently the batten surface layer with the thickness of 0.15 mm is formed on the upper surfaces of the edging member body.

In the co-extrusion of the edging member body and the batten surface layer, the molybdenum in the mixture for the batten surface layer is not melted and is extruded with the shapes of the particles or grains unchanged, and consequently a rough surface with projections is formed on the surface of the batten surface layer. Subsequently, the extruded product with the rough surface is cooled as it is moved through a cooling tank (F) and is then cut into the desired size to form finished goods (G).

The following Table 1 shows the results of extrusions performed with different ratios of the components of the mixture for forming the batten surface layer and of the subsequent examination of the resultant extruded products.

TABLE 1

|  | Sample 1 | Sample 2 | Sample 3 | Sample 4 |
| --- | --- | --- | --- | --- |
| high polymer polyethylene resin (molecular weight 300,000) | 100% | 90% | 80% | 70% |
| molybdenum grains (0.05 mm to 1.0 mm) | 0% | 10% | 20% | 30% |
| Shore D Hardness | 65 | 65 | 65 | 65 |
| result of extrusion of batten surface layer (with rough surface) | Δ | ○ | ○ | ○ |
| coefficient of kinetic friction to glass | 0.5 | 0.18 | 0.15 | 0.15 |
| abrasiveness of batten surface layer to glass (10,000 times) | U | A | A | A |

Δ = batten surface layer extruded without rough surface
○ = batten surface layer extruded with rough surface
U = Unacceptable (wore away during test)
A = Acceptable As shown in Table 1, the batten surface layer of sample 1 was not formed with the rough surface having projections on its surface, because no molybdenum was present. Thus, when tested in use by employing it in 10,000 repetitions of window glass opening and closing, the batten surface layer of sample 1 was worn away. In contrast, for samples 2, 3, 4 having 10%, 20% and 30% molybdenum, respectively, the batten surface layers were formed with rough surface layers having surface projections, and when tested in use through the 10,000 repetitions, these samples performed favorably in that the batten surface layers were not worn away, and few abrasions on the glass were caused by the projections.

The guide edging member and the press edging member according to the present invention make the raising and lowering of the window glass of the door light (or easy) and reliable with much less sliding resistance as well as without wear of materials after prolonged use. Because of the suitable contact with the window glass, the windows are completely protected from rainwater penetration and are provided with effective draining of rainwater. Further, the guide edging member and press edging member are provided with a cushionable contact with the window glass so as to completely absorb window vibrations and thereby preventing noise. In addition, there are such advantageous effects that the batten surface layer, having the powders and grains of mica, molybdenum and/or graphite, which does not melt even at high temperatures and which is mixed with the synthetic resin such as nylon, urethane, and polyolefin resin, is formed by extrusion unitarily with the edging member (i.e. the batten or contacting layers are co-extruded with the edging member), so that the rough surface having projections and recesses can be readily and reliably formed on the front surface of the batten surface layer, as the synthetic resin of low melting point is reliably melted and the powders and grains of mica, molybdenum or graphite remain unmelted. Further advantageous effects are that the size of the projections and recesses to be formed on the front surface of the batten surface layer can be suitably formed by properly selecting the materials, or the powder or grains. These advantages can be attained even if the edging member has sectional shapes such as curved surfaces, cornered surfaces, or the like.

What is claimed is:

1. A method of manufacturing an edging member for a window glass of an automobile door, comprising the steps of:

forming, from a mixture of a first synthetic resin material, selected from the group consisting of nylon and polyolefin resin, and particles or grains of at least one of mica, molybdenum and graphite, a contacting layer having a rough surface of projections and recesses formed by the presence of said particles or grains; and co-extruding said contacting layer simultaneously with a second synthetic resin material, comprising a thermoplastic flexible synthetic resin, by extruding said mixture together with said second synthetic resin material through a single die to form a unitary edging member having said rough contacting surface adapted to contact the window glass of the automobile door.

2. A method as recited in claim 1, wherein said step of forming comprises forming, from the mixture of the first synthetic resin material and the particles or grains of at least one of mica, molybdenum and graphite, a plurality of contacting layers having rough surfaces; and said step of co-extruding comprises co-extruding said plurality of contacting layers with the flexible second synthetic resin material to form the edging member with the plurality of rough contacting surfaces adapted to contact the window glass of the automobile door.

3. A method as recited in claim 2, wherein said edging member formed includes opposing pressing members adapted to contact opposing sides of the window glass and having thereon said rough contacting surfaces adapted to press against the window glass.

4. A method as recited in claim 2, wherein said second synthetic resin material comprises synthetic rubber.

5. A method of manufacturing an edging member for a window glass of an automobile door, comprising the steps of:

inserting into a first extruding machine a mixture of a synthetic resin, selected from the group consisting of nylon and polyolefin resin, and particles or grains of at least one of mica, molybdenum and graphite for forming a contacting layer having a rough surface of projections and recesses formed by the presence of said particles or grains and which is adapted to contact the window glass of the automobile door;

inserting into a second extruding machine a flexible synthetic resin selected from the group consisting of thermoplastic elastomer and polyolefin resin for forming an edging member body to be disposed in the automobile door; and co-extruding said contacting layer contained in said first extruding machine with said edging member body contained in said second extruding machine simultaneously through one die so as to cohere unitedly said contacting layer and said edging member body in said one die.

6. A method as recited in claim 5, wherein said edging member formed includes opposing pressing members, each of which is adapted to contact an opposing side of the window glass and has said rough contacting surface adapted to press against the window glass.

7. A method as recited in claim 5, wherein said step of co-extruding comprises:

providing said one die with a first channel having a first cross-sectional shape corresponding to a cross-sectional shape of said edging member body, and a second channel downstream of and contiguous with said first channel and having a cross-sectional shape corresponding to a cross-sectional shape of said edging member body with at least one contacting layer fixed thereon;

heating said one die;

extruding said flexible synthetic resin from said second extruding machine and into and through said first and second channels;

extruding said mixture, simultaneously with extrusion of said flexible synthetic resin, from said first extruding machine and into and through said second channel, such that said at least one contacting layer, formed from said mixture and having said rough contacting surface, is monolithically united with said edging member body while being forced through said second channel of said one die so as to form said edging member.

8. A method as recited in claim 7, further comprising passing said edging member through a cooling tank.

9. A method as recited in claim 8, further comprising after said edging member has been passed through said cooling tank, cutting said edging member to a desired length.

10. A method as recited in claim 7, wherein said one die provided includes a first die member having said first channel therein, and a second die member having said second channel therein.

11. A method as recited in claim 10, wherein said second die member has a flow channel formed therein which communicates with said first extruding machine and said second channel and allows said mixture to be fed from said first extruding machine to said second channel.

* * * * *